US007582861B2

(12) United States Patent
Mukaibatake

(10) Patent No.: US 7,582,861 B2
(45) Date of Patent: Sep. 1, 2009

(54) MASS SPECTROMETER

(75) Inventor: Kazuo Mukaibatake, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 436 days.

(21) Appl. No.: 11/589,817

(22) Filed: Oct. 31, 2006

(65) Prior Publication Data

US 2007/0114392 A1 May 24, 2007

(30) Foreign Application Priority Data

Nov. 2, 2005 (JP) ............................ 2005-318942

(51) Int. Cl.
*B01D 59/44* (2006.01)

(52) U.S. Cl. ...................................... 250/281; 250/294

(58) Field of Classification Search .......... 250/281–300
See application file for complete search history.

(56) References Cited

U.S. PATENT DOCUMENTS 5,783,824 A * 7/1998 Baba et al. .................. 250/281
7,034,293 B2 * 4/2006 Wells ......................... 250/292
7,064,317 B2 * 6/2006 McLuckey et al. .......... 250/282
7,329,879 B2 * 2/2008 Kernan et al. ........... 250/396 R
7,399,962 B2 * 7/2008 Makarov .................... 250/294
2004/0173740 A1 * 9/2004 McLuckey et al. .......... 250/288
2005/0167584 A1 * 8/2005 Kernan et al. ............... 250/290
2005/0263696 A1 * 12/2005 Wells ......................... 250/292
2006/0000192 A1 * 1/2006 Lindstrom ................... 53/587
2007/0023629 A1 * 2/2007 Makarov .................... 250/282

* cited by examiner

*Primary Examiner*—David A Vanore
*Assistant Examiner*—Andrew Smyth
(74) *Attorney, Agent, or Firm*—Sughrue Mion, PLLC

(57) ABSTRACT

Disclosed is a mass spectrometer, which includes an ion optical system for converging ions and transporting the ions to a subsequent stage. Instead of a conventional rod-shaped electrode, the ion optical system includes an electrode formed of a thin metal plate member. Specifically, each of four electrodes 41*a* to 41*d* formed of the metal plate members has an edge surface facing an ion optical axis C and extends along the ion optical axis C. Further, the electrodes 41*a* to 41*d* are disposed around the ion optical axis C in a radial pattern while keeping an angle of 90° between the adjacent electrodes. The present invention can provide the ion optical system at a lower cost.

12 Claims, 6 Drawing Sheets

MASS SPECTROMETER

BACKGROUND OF THE INVENTION

1. Field of the Invention

The present invention relates to a mass spectrometer, and more specifically to an ion-optical system for converging ions and transporting the ions to a subsequent stage in a mass spectrometer.

2. Description of the Related Art

Generally, in a liquid chromatograph mass spectrometer (LC/MS) which is a combination of a liquid chromatograph (LC) and a mass spectrometer (MS), an atmospheric pressure ionization process, such as an electrospray ionization (ESI) process or an atmospheric pressure chemical ionization (APCI) process, is used. In this spectrometer, while an ionization chamber is in an atmosphere of approximately atmospheric pressure, an analysis chamber internally equipped with a detector and a mass spectrometer, such as a quadrupole mass filter, is required to be maintained in a vacuum state. For this purpose, a differential evacuation system comprising one or more intermediate vacuum chambers provided between the analysis chamber and the ionization chamber is used for increasing vacuum in a stepwise manner.

FIG. 6 shows a fragmentary schematic block diagram of a conventional LC/MS (see, for example, Japanese Patent No. 3379485). This mass spectrometer comprises an ionization chamber 11 provided with a nozzle 12 connected to a column outlet end of a LC (not shown), an analysis chamber 21 internally equipped with a quadrupole mass filter 22 and a detector 23, and a first intermediate vacuum chamber 14, and a second intermediate vacuum chamber 18. The first and second intermediate vacuum chambers 14, 18 are located between the ionization chamber 11 and the analysis chamber 21, and separated from each other by a partition wall. The ionization chamber 11 and the first intermediate vacuum chamber 14 are communicated with each other only through a solvent extraction pipe 13 having a small diameter, and the first and second intermediate vacuum chambers 14, 18 are communicated with each other only through a skimmer 16 having a top formed with a passage hole (orifice) 17 having an extremely small diameter.

An internal space of the ionization chamber 11 serving as an ion source is maintained in an atmosphere of approximately atmospheric pressure (about $10^5$[Pa]) by vaporized molecules of a sample solution continuously supplied thereto from the nozzle 12. Then, an internal space of the first intermediate vacuum chamber 14 as a second stage is evacuated to a low vacuum state of about $10^2$[Pa] by a rotary pump 24. Further, an internal space of the second intermediate vacuum chamber 18 as a third stage is evacuated to a medium vacuum state of about $10^{-1}$ to $10^{-2}$ [Pa] by a turbo-molecular pump 25, and an internal space of the analysis chamber 21 as the last stage is evacuated to a high vacuum state of about $10^{-3}$ to $10^{-4}$ [Pa] by another turbo-molecular pump 26. That is, a multi-stage differential evacuation system adapted to increase vacuum stepwise from the ionization chamber 11 to the analysis chamber 21 on a chamber to chamber basis is formed to allow the internal space of the analysis chamber 21 as the last stage to be maintained in a high vacuum state.

An operation of this mass spectrometer will be schematically described below. A sample solution is sprayed from a tip of the nozzle 12 into the ionization chamber 11 while being electrically charged, and molecules of the sample are ionized in a course of vaporization of a solvent in the droplets. The droplets mixed with ions are drawn into the solvent extraction pipe 13 due to a pressure difference between the ionization chamber 11 and the first intermediate vacuum chamber 14. In a course of passing through the heated solvent extraction pipe 13, the solvent is further vaporized and the ionization is accelerated. A first lens electrode 15 having a plurality (four) of plate-shaped electrodes arranged in three lines in a sloped manner is disposed in the first intermediate vacuum chamber 14, to generate an electric field so as to help the drawing of ions through the solvent extraction pipe 13 and converge the ions around the orifice 16. The ions introduced into the second intermediate vacuum chamber 18 through the orifice 17 are converged by an octapole-type second lens electrode 19 comprising eight rod electrodes, and sent to the analysis chamber 21. In the analysis chamber 21, only a part of the ions having a specific mass number (mass/charge) pass through a longitudinal space of the quadrupole mass filter 22, and the remaining ions having other mass numbers diverge from the longitudinal space. Then, the ions passing through the quadrupole mass filter 22 reach the detector 23, and the detector 23 outputs an ionic strength signal corresponding to an amount of the received ions.

In the above mass spectrometer, the first lens electrode 15 and the second lens electrode 19 are collectively dubbed "ion optical system". A major function of these lens electrodes is to converge flying ions based on an electric field, and, in some cases, additionally accelerate and send the ions to a subsequent stage. Heretofore, various configurations have been proposed for the lens electrodes. In the example illustrated in FIG. 6, the second lens electrode 19 arranged in the second intermediate vacuum chamber 18 is a multi-rod type having a plurality (while the number in this example is eight, it may be any even number, such as four or six) of columnar-shaped rod electrodes (pole electrodes) arranged to surround an ion optical axis C, as shown in FIG. 7. In this case, a voltage superimposed with a high-frequency voltage having the same DC voltage and an inversed phase is applied to the adjacent rod electrodes. Thus, ions introduced in an extension direction of the ion optical axis C travel while being vibrated at a given frequency by a high-frequency electric field generated in the rod electrodes. In the multi-rod type lens electrode, there has also been known a square pole-shaped rod electrode instead of the columnar-shaped rod electrode (see U.S. Pat. No. 6,441,370).

Generally, the rod electrode, such as the columnar-shaped rod electrode or the square pole-shaped rod electrode, has to be formed by subjecting a metal block to cutting to have a required size and accuracy. Thus, a machining cost is apt to increase. Moreover, a connection between the rod electrode and a cable for applying a voltage to the electrode has to be performed by welding or the like. This operation is troublesome and costly. Further, in the ion optical system using the rod electrodes, a communication space between an internal space surrounded by the rod electrodes and an external space becomes narrow to cause a problem about a difficulty in evacuating air from the internal space of the ion optical system, and the need for taking time to evacuate the internal space to have given vacuum.

SUMMARY OF THE INVENTION

In view of the above problems, it is a principal object of the present invention to provide an ion optical system for converging ions and transporting the ions to a subsequent stage in a mass spectrometer, at a lower cost as compared with the conventional system.

In order to achieve the object, the present invention provides a mass spectrometer comprising an ion optical system which is disposed on an ion transit path between an ion source for generating ions and a mass analyzer for separating ions on a mass number basis, and adapted to form a high-frequency electric field and/or an electrostatic field so as to converge ions and transport the ions to a subsequent stage. The ion optical system includes a number n of metal plate members each serving as an electrode (wherein n is an even number of four or more). Each of the metal plate members is disposed to extend along an ion optical axis, in such a manner that respective thin edge surfaces of the metal plate members face and surround the ion optical axis.

In the mass spectrometer of the present invention, each of the number n of electrodes constituting the ion optical system is a metal plate member instead of a metal block as in the conventional ion optical system. Thus, the metal plate member can be formed, for example, by subjecting a large sheet metal to shearing, cutting or punching. Specifically, a metal plate member having a given shape can be readily formed by a wire-EDM process, a laser machining process or a shearing process. Thus, there is no need to taking time for forming each of the electrodes. In addition, a cable for applying an AC voltage or a DC voltage can be fixed to the electrode by a low-cost process, such as soldering. This makes it possible to reduce a cost of the ion optical system as compared with the conventional ion optical system.

In the ion optical system of the mass spectrometer of the present invention, each of the thin edge surfaces of the number n of metal plate members is disposed to face the ion optical axis, and an electric field formed in an internal space based on a potential between the edge surface and each edge region of opposite side surfaces on both sides of the edge surface acts on ions. While an electric field around the edge surface is not exactly sufficient to converge ions due to a small width of the edge surface, the electric field has an adequate shape at a position away from the edge surface and closer to the ion optical axis. Therefore, an appropriate voltage can be applied to the electrodes to fulfill an adequate function of sending ions to a subsequent stage while preventing spreading of the ions.

Each of the metal plate members is disposed to extend along the ion optical axis. Thus, a relatively wide space can be ensured between the two metal plate members adjacent to each other around the ion optical axis. This makes it possible to provide enhanced communication between internal and external spaces of the ion optical system so as to avoid the problem about the need for taking wasted time to evacuate air of an intermediate vacuum chamber provided with the ion optical system, or the like.

In view of readily forming the metal plate member using the above process, preferably, the metal plate member has a plate thickness of 5 mm or less. In this case, if the plate thickness is excessively reduced, the metal plate member is likely to cause bending due to lowered strength, which leads to disturbance in the electric field and deterioration in convergence of the ions. From this point of view, the plate thickness is preferably set at 0.5 mm or more.

As one arrangement of the number n of metal plate members, the edge surface facing the ion optical axis may be typically arranged parallel to the ion optical axis. In this case, during passage of the internal space of the ion optical system, ions receive no action of deceleration or acceleration.

As another arrangement, each of the metal plate members may be disposed such that the edge surface facing the ion optical axis is inclined to come close to or get away from the ion optical axis toward a traveling direction of the ions. In the former case, the intensity of the electric field is increased along with traveling of the ions, to accelerate the ions. In the latter case, the intensity of the electric field is reduced along with traveling of the ions, to decelerate the ions.

In particular, the laser machining process allows a sheet metal to be cut in various shapes, such as a sine-wave shape, a saw-tooth shape or a rectangular-wave shape, readily with a high degree of accuracy. The electrode formed of a metal plate member having such a particular shape can temporarily capture ions, in addition to accelerating and decelerating the ions in the internal space of the ion optical system as described above.

While the ion optical system in the mass spectrometer of the present invention may be used simply for introducing ions into the mass separator, such as a quadrupole mass filter, it may be conveniently used in a so-called tandem mass spectrometer. Specifically, first and second mass separators are disposed, respectively, in preceding and subsequent stages relative to the ion optical system, and the ion optical system has gas for collision-induced dissociation (hereinafter referred to as "collision-induced dissociation gas") is introduced into the internal space of. The first mass separator is operable to separate and select ion species having a specific mass number. Then, the selected ion species are subjected to collision—induced dissociation in the internal space of the ion optical system, and created ions are sent to the second mass separator. In this tandem mass spectrometer, while the ions introduced into the internal space of the ion optical system and reduced in kinetic energy due to collision with the collision-induced dissociation gas are likely to stagnate, ions created by the collision-induced dissociation can be accelerated in the above manner to adequately pass through the internal space of the ion optical system, and efficiently sent to the second mass separator.

DETAILED DESCRIPTION OF THE EMBODIMENTS

Figure 1:
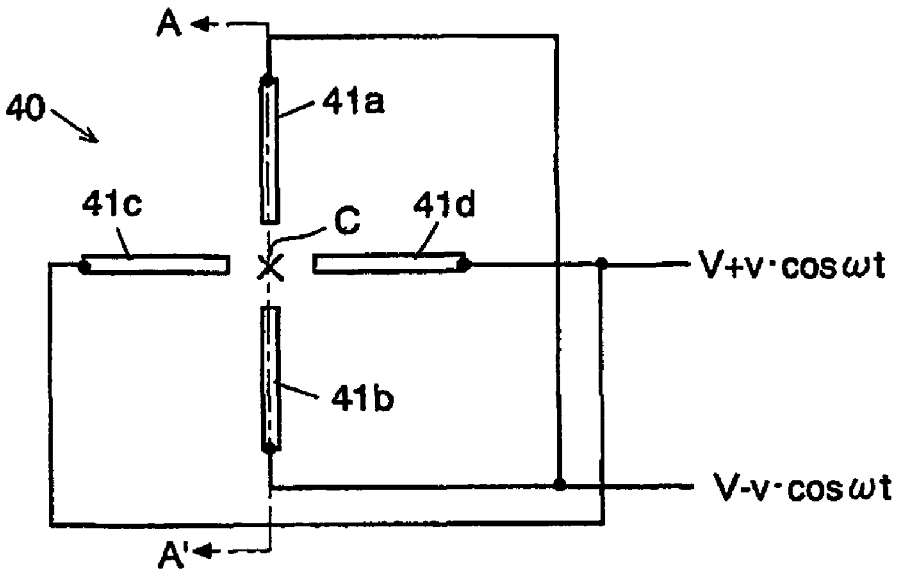
FIG. 1 is a schematic diagram showing an ion optical system serving as a second lens electrode in a mass spectrometer according to one embodiment of the present invention, viewed from the side of an ion incident end of the ion optical system.
Figure 2:
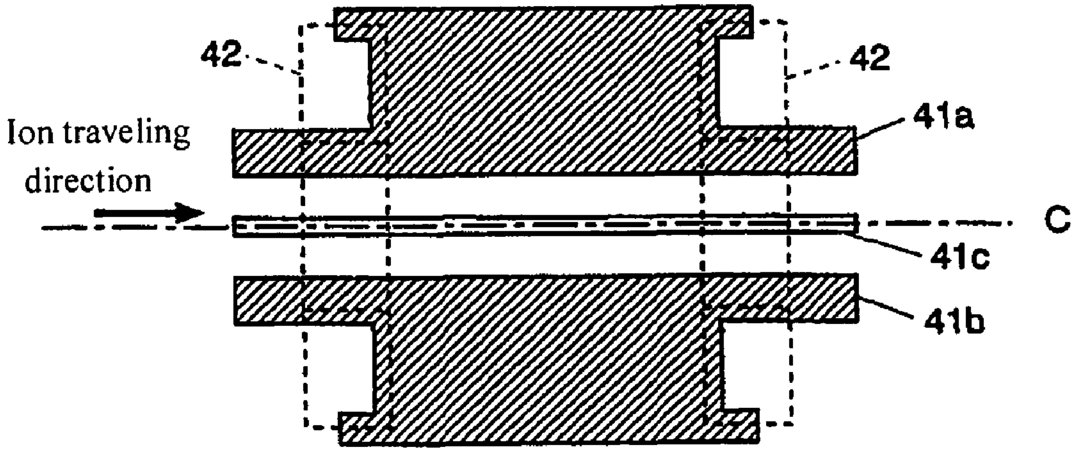
FIG. 2 is a sectional view taken along the line A-A' in FIG. 1.
Figure 3:
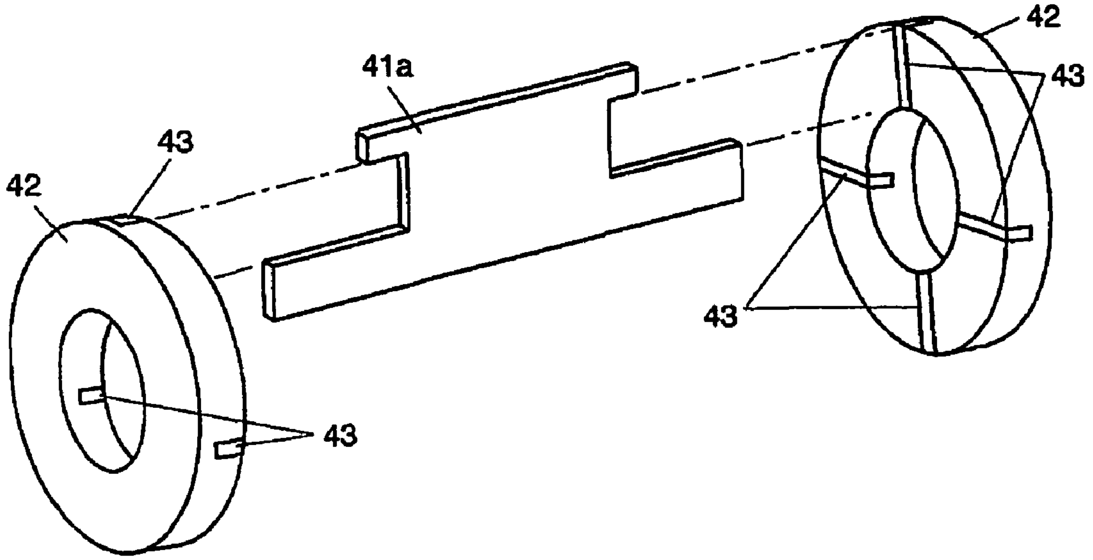
FIG. 3 is a fragmentary assembling diagram of the ion optical system.
Figure 6:
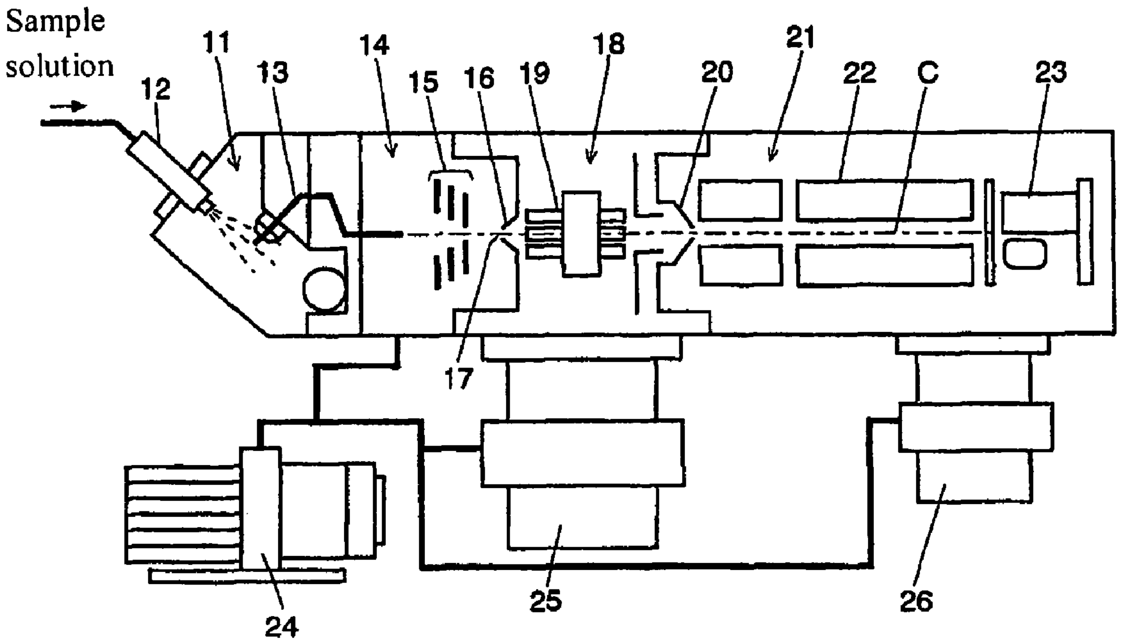
FIG. 6 is a fragmentary schematic block diagram showing a conventional LC/MS.
Figure 7:
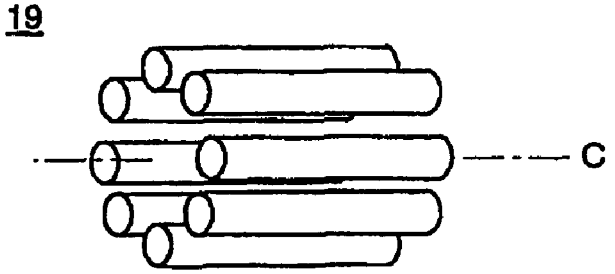
FIG. 7 is a schematic perspective view showing a multi-rod type lens electrode.

With reference to FIGS. 1 to 3, a mass spectrometer according to one embodiment of the present invention will now be described. Except that an ion optical system to be disposed in the intermediate vacuum chamber 18 in FIG. 6 is different from that in FIG. 6, a fundamental structure of the mass spectrometer according to this embodiment is the same as that illustrated in FIG. 6. The difference will be specifically described below.

FIG. 1 is a schematic diagram showing an ion optical system 40 serving as a second lens electrode in the mass spectrometer according to this embodiment, viewed from the side of an ion incident end of the ion optical system. FIG. 2 is a sectional view taken along the line A-A' in FIG. 1, and FIG. 3 is a fragmentary assembling diagram of the ion optical system.

The ion optical system 40 in this embodiment comprises four electrodes 41*a*, 41*b*, 41*c*, 41*d* each formed of a metal plate member having a given shape. Each of the electrodes 41*a*, 41*b*, 41*c*, 41*d* has an edge surface facing an ion optical axis C and extends along the ion optical axis C. Further, the electrodes 41*a*, 41*b*, 41*c*, 41*d* are disposed around the ion optical axis C in a radial pattern while keeping an angle of 90° between the adjacent electrodes. That is, the four electrodes 41*a*, 41*b*, 41*c*, 41*d* are arranged rotationally symmetrically about the ion optical axis C. While the electrode structure in this embodiment are a quadrupole structure comprising the four electrodes, the number of electrodes may be an even number of four or more to provide a hexapole structure, an octopole structure or the like so as to form a multipole electric field.

In the four electrodes 41*a* to 41*d*, the two electrodes disposed in opposed relation to each other across the ion optical axis C are wire-connected to each other. A voltage V+v·cos ωt formed by superimposing a high-frequency voltage v·cos ωt on a DC voltage V is applied from a voltage supply circuit (not shown) to the electrodes 41*a*, 41*b*. Further, a voltage V−v·cos ωt formed by superimposing a high-frequency voltage having an inversed phase (i.e., a phase lag of 180°) relative to the above high-frequency voltage on the DC voltage V is applied from the voltage supply circuit to the electrodes 41*c*, 41*d*. That is, the DC voltage serves as a bias voltage for the high-frequency voltage. Based on the high-frequency voltage, a multipole electric field is formed in a space surrounded by the four electrodes 41*a* to 41*d*, to converge ions.

The four electrodes 41*a* to 41*d* are disposed to spatially maintain a positional relationship therebetween as shown in FIGS. 1 and 2. In order to achieve this arrangement, as shown in FIG. 3, two holders 42 made of an insulating material, such as ceramic, are used. Specifically, each of the holders 42 having an annular shape is formed with four grooves 43 at positions for receiving therein the four electrodes 41*a* to 41*d* in a fitting manner individually. While FIG. 3 shows only the electrode 41*a*, the two holders 42 are disposed to clamp the four electrodes 41*a* to 41*d* from opposite sides thereof while fitting the four electrodes 41*a* to 41*d* into the corresponding grooves 43, so that the electrodes 41*a* to 41*d* are accurately positioned relative to each other. The unit of the ion optical system 40 assembled in this manner may be arranged such that an axis of the unit is aligned with the ion optical axis C.

The electrode plate member serving as each of the electrodes 41*a* to 41*d* may be formed by cutting a sheet metal having a plate thickness of about 0.5 to 5 mm, into a given shape, for example, by a laser machining process. In the ion optical system 40 having the above structure, it is particularly important to ensure accuracy in symmetry of the electrodes 41*a* to 41*d* about the ion optical axis C. In this regard, an edge surface of a sheet metal cut by the laser machining process has excellent linearity and thoroughly meets the above purpose. It is understood that the accuracy required for this ion optical system can also be ensured using another machining process. While the plate thickness of the electrode plate member may be greater than 5 mm, the increase in plate thickness leads to deterioration in workability or machinability. Conversely, if the plate thickness is excessively reduced, the electrode plate member is liable to cause bending when it is attached to the holders 42. Thus, depending on a material, the plate thickness is preferably set at about 0.5 mm or more.

The mass spectrometer according to this embodiment is designed to apply a high-frequency voltage to the electrodes so as to form a multipole electric field. In cases where only a DC voltage is applied to the electrodes to form an electrostatic field, the number of electrodes may not be necessary to be an even number.

Figure 4A:
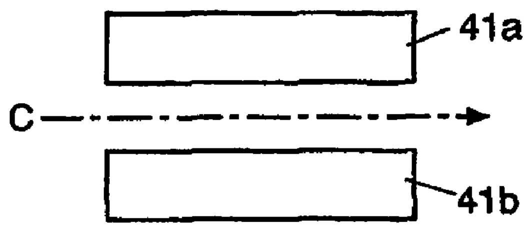
FIGS. 4A-4C are schematic diagrams showing another arrangement of electrodes in the ion optical system.
Figure 4B:
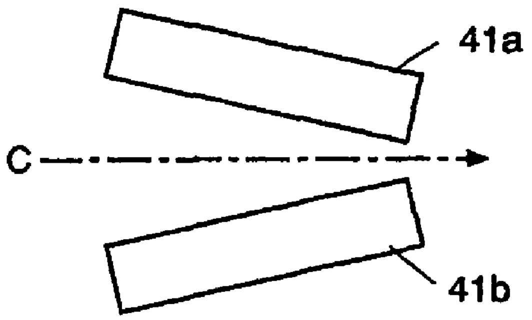
Figure 4C:
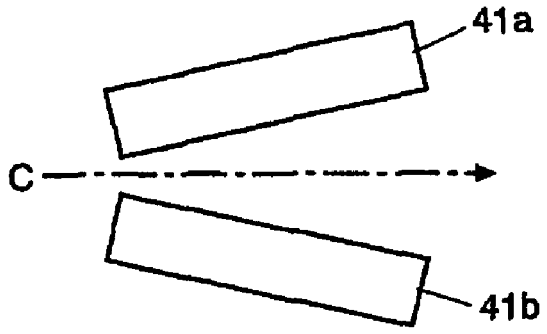

In the mass spectrometer according to this embodiment, each of the edge surfaces of the electrodes 41*a* to 41*d* is disposed parallel to the ion optical axis C, as shown in FIG. 4A. In this case, the multipole electric field is operable to simply converge ions without acceleration and deceleration thereof. Differently from this arrangement, each of the electrodes 41*a* to 41*d* may be disposed such that the edge surface thereof is inclined to come close to the ion optical axis C toward an ion traveling direction, as shown in FIG. 4B. Alternatively, each of the electrodes 41*a* to 41*d* may be disposed such that the edge surface thereof is inclined to get away from the ion optical axis C toward the ion traveling direction. The intensity of the multipole electric field is increased as each of the edge surfaces of the electrodes 41*a* to 41*d* comes closer to the ion optical axis C, as shown in FIG. 4C. Thus, in the arrangement illustrated in FIG. 4B, ions are accelerated. In the arrangement illustrated in FIG. 4C, ions are decelerated.

Figure 5A:
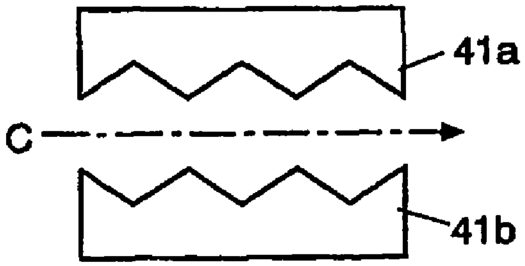
FIGS. 5A-5C are schematic diagrams showing another arrangement of electrodes in the ion optical system.
Figure 5B:
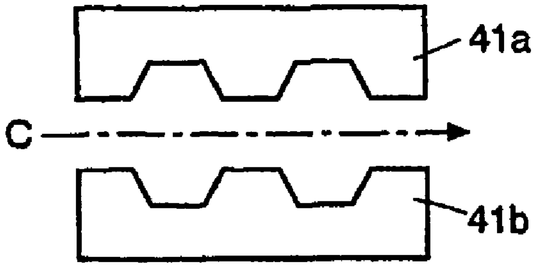
Figure 5C:
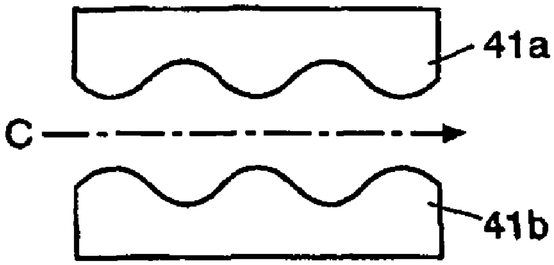

In the laser machining process for cutting a sheet metal to form the metal plate member, the metal plate member can be formed in a complicated shape readily and accurately. This makes it possible to form the edge surface of the electrode in various shapes, such as a sine-wave shape (FIG. 5A), a rectangular-wave shape (FIG. 5B) or a triangular-wave shape (FIG. 5C). In the ion optical system having these particular shapes, ions introduced into the internal space of the ion optical system is reputedly accelerated and decelerated. Thus, this ion optical system can be used as a sort of ion trap capable of temporarily holding ions.

Figure 8:
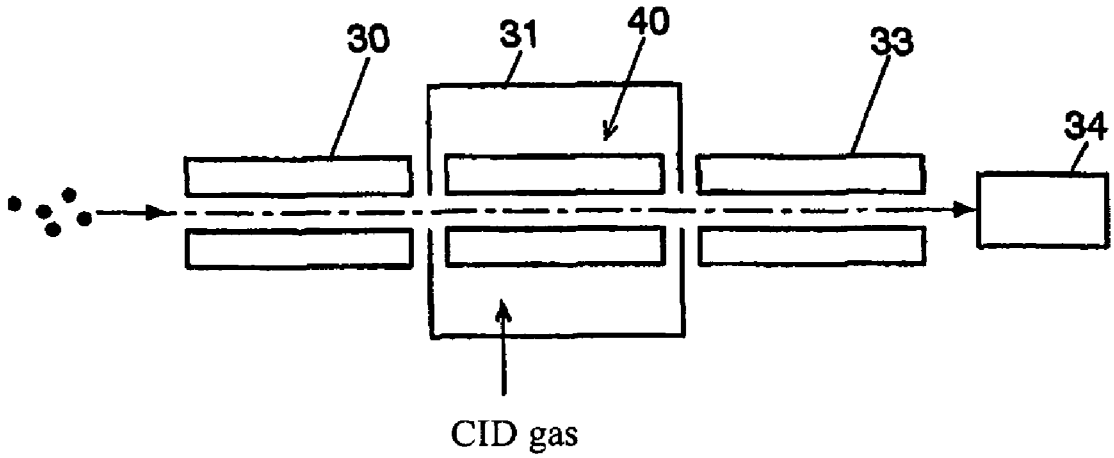
FIG. 8 is a fragmentary schematic block diagram showing a tandem mass spectrometer.

The aforementioned various ion optical systems may be used in various types of mass spectrometer as well as the above mass spectrometer adapted to ionize at atmospheric pressure. FIG. 8 is a schematic block diagram showing a tandem mass spectrometer for MS/MS analysis. In this tandem mass spectrometer, a first-stage quadrupole mass filter 30, a collision chamber 31 and a second-stage quadrupole mass filter 33 are disposed along an ion transit path, and the above ion optical system 40 is disposed inside the collision chamber 31. When ions are introduced from the left side in FIG. 8, the first-stage quadrupole mass filter 30 is operable to select only a part of the ions having a specific mass number, and the selected ions are introduced into the ion optical system 40 in the collision chamber 31. Further, collision-induced dissociation (CID) gas is introduced in the collision chamber 31. Thus, the ions selected in the first stage are dissociated due to collision with the CID gas, and product ions created through the dissociation are introduced into the second-stage quadrupole mass filter 33. Then, the second-stage quadrupole mass filter 33 is operable to select a part of the product ions having a specific mess number, and the selected product ions reaching the detector 34 are detected.

An advantageous embodiment of the present invention has been shown and described. It is obvious to those skilled in the art that various changes and modifications may be made therein without departing from the spirit and scope thereof, and such changes and modifications may be included within the scope of the present invention as defined by the appended claims.

What is claimed is:

1. A mass spectrometer comprising:

an ion source for ionizing sample atoms or molecules;

a mass separator section for separating ions on a mass number basis; and an ion optical system disposed on an ion transit path between said ion source and said mass separator section and adapted to form a high-frequency electric field and/or an electrostatic field so as to converge ions and transport the ions to a subsequent stage, said ion optical system including a number n of metal plate members each serving as an electrode (wherein n is an even number of four or more), each of said metal plate members being disposed to extend along an ion optical axis, in such a manner that respective thin edge surfaces of said metal plate members face and surround said ion optical axis, wherein each of said metal plate members constituting said ion optical system is disposed such that the edge surface thereof facing the ion optical axis is inclined to come close to or get away from said ion optical axis toward a traveling direction of the ions.

2. The mass spectrometer as defined in claim 1, wherein each of said metal plate members is prepared by subjecting a sheet metal to a process selected from the group consisting of shearing, cutting and punching.

3. The mass spectrometer as defined in claim 1, wherein each of said metal plate members has a plate thickness of 5 mm or less.

4. The mass spectrometer as defined in claim 1, wherein:

said mass separator section includes a first mass separator and a second mass separator which are disposed, respectively, in preceding and subsequent stages relative to said ion optical system; and said ion optical system has collision-induced dissociation gas introduced into an internal space thereof, wherein:

said first mass separator is operable to select ion species having a specific mass number; and said ion optical system is operable to subject said selected ion species to collision-induced dissociation in the internal space thereof, and send created ions to said second mass separator.

5. The mass spectrometer as defined in claim 2, wherein each of said metal plate members has a plate thickness of 5 mm or less.

6. The mass spectrometer as defined in claim 2, wherein:

said mass separator section includes a first mass separator and a second mass separator which are disposed, respectively, in preceding and subsequent stages relative to said ion optical system; and said ion optical system has collision-induced dissociation gas introduced into an internal space thereof, wherein:

said first mass separator is operable to select ion species having a specific mass number; and said ion optical system is operable to subject said selected ion species to collision-induced dissociation in the internal space thereof, and send created ions to said second mass separator.

7. The mass spectrometer as defined in claim 3, wherein:

said mass separator section includes a first mass separator and a second mass separator which are disposed, respectively, in preceding and subsequent stages relative to said ion optical system; and said ion optical system has collision-induced dissociation gas introduced into an internal space thereof, wherein:

said first mass separator is operable to select ion species having a specific mass number; and said ion optical system is operable to subject said selected ion species to collision-induced dissociation in the internal space thereof, and send created ions to said second mass separator.

8. The mass spectrometer as defined in claim 5, wherein:

said mass separator section includes a first mass separator and a second mass separator which are disposed, respectively, in preceding and subsequent stages relative to said ion optical system; and said ion optical system has collision-induced dissociation gas introduced into an internal space thereof, wherein:

said first mass separator is operable to select ion species having a specific mass number; and said ion optical system is operable to subject said selected ion species to collision-induced dissociation in the internal space thereof, and send created ions to said second mass separator.

9. A mass spectrometer comprising:

an ion source for ionizing sample atoms or molecules;

a mass separator section for separating ions on a mass number basis; and an ion optical system disposed on an ion transit path between said ion source and said mass separator section and adapted to form a high-frequency electric field and/or an electrostatic field so as to converge ions and transport the ions to a subsequent stage, said ion optical system including a number n of metal plate members each serving as an electrode (wherein n is an even number of four or more), each of said metal plate members being disposed to extend along an ion optical axis, in such a manner that respective thin edge surfaces of said metal plate members face and surround said ion optical axis, wherein each of said metal plate members constituting said ion optical system is disposed such that the edge surface thereof facing the ion optical axis is angled toward and away from said ion optical axis in adjacent portions of said metal plate members relative to a traveling direction of the ions.

10. The mass spectrometer as defined in claim 9, wherein each of said metal plate members is prepared by subjecting a sheet metal to a process selected from the group consisting of shearing, cutting and punching.

11. The mass spectrometer as defined in claim 9, wherein each of said metal plate members has a plate thickness of 5 mm or less.

12. The mass spectrometer as defined in claim 9, wherein:

said mass separator section includes a first mass separator and a second mass separator which are disposed, respectively, in preceding and subsequent stages relative to said ion optical system; and said ion optical system has collision-induced dissociation gas introduced into an internal space thereof, wherein:

said first mass separator is operable to select ion species having a specific mass number; and said ion optical system is operable to subject said selected ion species to collision-induced dissociation in the internal space thereof, and send created ions to said second mass separator.

* * * * *